UNITED STATES PATENT OFFICE.

EDWIN O. BARSTOW, OF MIDLAND, MICHIGAN, ASSIGNOR TO THE DOW CHEMICAL COMPANY, OF MIDLAND, MICHIGAN, A CORPORATION OF MICHIGAN.

METHOD OF MANUFACTURING ARSENATE OF LEAD.

1,184,694.

Specification of Letters Patent. Patented May 23, 1916.

No Drawing. Application filed August 1, 1912. Serial No. 712,678.

*To all whom it may concern:*

Be it known that I, EDWIN O. BARSTOW, a citizen of the United States, and a resident of Midland, county of Midland, and State of Michigan, have invented a new and useful Improvement in Methods of Manufacturing Arsenate of Lead, of which the following is a specification, the principle of the invention being herein explained and the best mode in which I have contemplated applying that principle, so as to distinguish it from other inventions.

The present method, or process, may be regarded as a modification of the general process of manufacturing lead arsenate presented in my co-pending application, filed even date herewith and since issued into Patent No. 1,169,114, dated January 25, 1916. In this case, as in such  ...eral process, the mode of procedure involved is equally applicable to the manufacture of other insoluble metallic arsenates than such lead arsenate, as for example, zinc, iron, and barium arsenates.

The process constituting the present invention, then, consists of the steps hereinafter fully described and particularly pointed out in the claims.

The following description sets forth in detail an approved mode of carrying out the invention, such disclosed mode, however, being merely illustrative of the various ways in which the principle of the invention may be used.

The general method of procedure involved in the improved process under consideration consists in oxidizing an arsenic derivative to arsenic acid by means of a halogen; providing a compound to form a haloid with such halogen reagent; and adding a suitable compound of the metal, the arsenate of which is desired. As previously indicated, the process is applicable to any metal capable of being precipitated as such arsenate from its corresponding soluble salt, such as its haloid.

In carrying out the present specific form of the aforesaid general process, white arsenic, or arsenious oxid ($As_2O_3$), as the specific arsenic derivative of such general process, is oxidized to arsenic acid by being treated with chlorin, as the specific halogen of such process, in the presence of water. As is well known, there results from the foregoing, a mixture of arsenic acid ($H_3AsO_4$) and hydrochloric acid (HCl), and the reaction occurring in this step of the process may be represented by the following equation:—

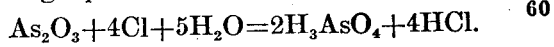
$$As_2O_3 + 4Cl + 5H_2O = 2H_3AsO_4 + 4HCl.$$

To this acid solution, sodium arsenate ($Na_2HAsO_4$), or an equivalent soluble arsenate, is added in quantity at least sufficient to furnish base equivalent to the halogen used. As a result, a complex solution is obtained, containing sodium arsenate, free arsenic acid, sodium chlorid and free hydrochloric acid. The conversion of part of the hydrochloric acid into the sodium chlorid thus resulting may be explained by the following reaction:—

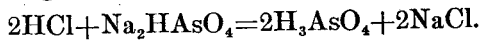
$$2HCl + Na_2HAsO_4 = 2H_3AsO_4 + 2NaCl.$$

The remaining step, referring for the sake of illustration to the case where it is lead arsenate that is wanted, is carried out by adding to the aforesaid solution an oxid, hydrate, carbonate, or basic carbonate of lead, which results in the formation of the end-products, namely lead arsenate and sodium chlorid.

The following reaction may be used to explain the production of the end-products just named:—

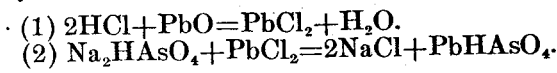
(1) $2HCl + PbO = PbCl_2 + H_2O.$
(2) $Na_2HAsO_4 + PbCl_2 = 2NaCl + PbHAsO_4.$ Or thus:—

$$H_3AsO_4 + PbO = PbHAsO_4 + H_2O.$$

The chlorination of the white arsenic in water may be conducted in stone-ware, coke-packed chlorination towers, the mixture to be chlorinated being pumped continuously over said towers. A stirrer may be fitted to the charging tank so as to keep the white arsenic in suspension, in order that it will be pumped over the chlorinating tower together with the water; or the rate of pumping may be so great that enough arsenic will will be carried in solution to take up the chlorin as fast as it is supplied, and the tank itself be used simply as a saturating tank. The soluble arsenate and the lead oxid, or equivalent oxygen derivative of the metal are then added to the resulting solution of arsenic and hydrochloric acid, this operation being satisfactorily conducted in a wooden tank provided with a suitable stirrer and with the solution so concentrated that the resulting mass will have the consistency of a cream, or paste. It has been discovered that by sufficiently prolonging the stirring, the lead arsenate may be made from the solid lead oxid, hydrate, carbonate, or basic carbonate, despite the fact that, at first sight, it would seem that this reaction could not be carried to completion because, the resulting product being solid, all of the lead oxid would not be reacted upon, but particles of it would be inclosed in an impervious coating of the lead arsenate. By subjecting the liquid, however, to prolonged stirring or agitation, this tendency has been successfully overcome as above indicated. The lead arsenate so obtained may be conveniently separated out by filtration and should be washed to remove the soluble salts that are mixed with it.

As just indicated, the addition of the soluble arsenate and lead oxid to the solution may be effected simultaneously, or if more convenient they may be added separately. In the latter event, either the arsenate or oxid may be added first, although preferably the arsenate precedes the other.

Preferably, the amount of soluble arsenate used is somewhat greater than required to furnish base equivalent to the hydrochloric acid present. Conversely the amount of lead oxid, or other lead compound, that is subsequently added will preferably be slightly less than an equivalent of the free acid in the solution at this stage in the general operations. In case these compounds are used in the relative quantities just indicated, there will be left in the final filtrate some soluble arsenic, that is either arsenic acid or soluble arsenate. These may be recovered in any suitable fashion, before discarding the filtrate.

The oxygen derivatives of lead, which are suitable for use as compounds of that metal for reacting with arsenic acid to form lead arsenate, have been already indicated. The term "oxygen derivative" is intended therefore to connote such equivalents of lead oxid in addition to the other lead compounds that have been specifically named, as will form the compound in question under the conditions surrounding the reaction. By way of general comment, it should further be noted that both the acid lead arsenate $PbHAsO_4$, and the normal arsenate $Pb_3(AsO_4)_2$, are both commonly known to the trade, as arsenate of lead. The latter term is accordingly to be understood as used herein, in this general sense, and not as referring specifically to either of the two arsenates named, except where the contrary is indicated. So, too, a soluble alkaline earth arsenate may be used instead of the alkaline arsenate hereinbefore specified as the preferred soluble article, as will be readily understood, and such equivalent is intended to be connoted by the term "alkaline" as herein employed.

It is proper to repeat by way of conclusion, that the several equations which have hereinbefore been referred to as expressive of the different reactions involved, are presented as illustrative merely of the principal phenomena. They do not, however, necessarily represent all of the reactions that occur, and should be understood as indicating how the desired end product is derived, rather than the exact intermediate steps leading up thereto.

From the standpoint of the manufacturer or practical chemist, indeed, it might be better to represent the whole series of detailed reactions pertaining to each particular process or sub-process described above, as a single comprehensive reaction, in which only the starting materials and observed end-products are given. Thus, for example, the specific mode of operation herein claimed, may be represented as follows:—

$$As_2O_3 + 4Cl + 2Na_2HAsO_4 + H_2O + 4PbO = 4PbHAsO_4 + 4NaCl.$$

In other words, so far as the commercial operation of the process in hand is concerned, it may be regarded as consisting in a reaction between white arsenic, chlorin, sodium arsenate and lead oxid.

Other modes of applying the principle of my invention may be employed instead of the one explained, change being made as regards the process herein disclosed, provided the step or steps stated by any one of the following claims or the equivalent of such stated step or steps be employed.

I therefore particularly point out and distinctly claim as my invention:—

1. In a method of making an insoluble metallic arsenate, the step which consists in reacting in the presence of water between arsenious oxid, a halogen, a soluble arsenate, and an oxygen derivative of the metal, of which the arsenate is desired, such derivative being adapted to produce such arsenate upon being added to a solution of arsenic acid.

2. In a method of making an insoluble metallic arsenate, the step which consists in reacting in the presence of water between arsenious oxid, chlorin, an alkaline arsenate, and an oxygen derivative of the metal, of which the arsenate is desired, such derivative being adapted to produce such arsenate upon being added to a solution of arsenic acid.

3. In a method of making an insoluble metallic arsenate, the step which consists in reacting in the presence of water between arsenious oxid, chlorin, sodium arsenate in quantity carrying base at least equivalent to such chlorin, and an oxid of the metal of which the arsenate is desired.

4. In a method of making lead arsenate, the step which consists in reacting in the presence of water between arsenious oxid, a halogen, a soluble arsenate, and an oxygen derivative of lead, adapted to produce lead arsenate upon being added to a solution of arsenic acid.

5. In a method of making lead arsenate, the step which consists in reacting in the presence of water between arsenious oxid, chlorin, an alkaline arsenate, and an oxygen derivative of lead, adapted to produce lead arsenate upon being added to a solution of arsenic acid.

6. In a method of making lead arsenate, the step which consists in reacting between an arsenious oxid, chlorin, sodium arsenate in quantity carrying base at least equivalent to the chlorin so used, and lead oxid.

7. In a method of making an insoluble metallic arsenate, the step which consists in mixing a soluble arsenate with a solution of arsenic and hydrochloric acids.

8. In a method of making an insoluble metallic arsenate, the step which consists in mixing with a solution of arsenic and hydrochloric acids a soluble arsenate in an amount carrying base equivalent to said hydrochloric acid.

9. In a method of making an insoluble metallic arsenate, the step which consists in mixing with a solution of arsenic and hydrochloric acids a solution of sodium arsenate in an amount carrying base equivalent to said hydrochloric acid.

10. In a method of making an insoluble metallic arsenate, the steps which consist in mixing a soluble arsenate with a solution of arsenic and hydrochloric acids; and adding a suitable compound of the metal of which the arsenate is desired.

11. In a method of making an insoluble metallic arsenate, the steps which consist in mixing with a solution of arsenic and hydrochloric acids a soluble arsenate in an amount carrying base at least equivalent to said hydrochloric acid; and adding an oxygen derivative of the metal, of which the arsenate is desired, such derivative being adapted to produce such arsenate upon being added to a solution of arsenic acid.

12. In a method of making an insoluble metallic arsenate, the steps which consist in mixing with a solution of arsenic and hydrochloric acids a soluble arsenate in an amount carrying base more than equivalent to said hydrochloric acid; and adding an oxygen derivative of the metal, of which the arsenate is desired, such derivative being adapted to produce such arsenate upon being added to a solution of arsenic acid.

13. In a method of making an insoluble metallic arsenate, the steps which consist in mixing with a solution of arsenic and hydrochloric acids a soluble arsenate in an amount carrying base more than equivalent to said hydrochloric acid; and adding an oxygen derivative of the metal, of which the arsenate is desired, such oxygen derivative of the metal being adapted to produce such arsenate upon being added to a solution of arsenic acid, and being added in an amount insufficient to combine with all the free acid present.

14. In a method of making lead arsenate, the steps which consist in mixing a soluble arsenate with a solution of arsenic and hydrochloric acids, and adding an oxygen derivative of lead adapted to produce lead arsenate upon being added to a solution of arsenic acid.

15. In a method of making lead arsenate, the steps which consist in mixing with a solution of arsenic and hydrochloric acids a soluble arsenate in an amount carrying base at least equivalent to said hydrochloric acid; and adding an oxygen derivative of lead adapted to produce lead arsenate upon being added to a solution of arsenate acid.

16. In a method of making lead arsenate, the steps which consist in mixing with a solution of arsenic and hydrochloric acids a soluble arsenate in an amount carrying base more than equivalent to said hydrochloric acid; and adding an oxygen derivative of lead, such oxygen derivative of lead being adapted to produce lead arsenate upon being added to a solution of arsenic acid and being added in an amount insufficient to combine with all the free acid present.

17. In a method of making lead arsenate, the steps which consist in mixing with a solution of arsenic and hydrochloric acids a solution of sodium arsenate in an amount carrying base more than equivalent to said hydrochloric acid; and adding lead oxid, such oxid being added in an amount insufficient to combine with all the free acid present.

Signed by me this 27th day of July, 1912.

EDWIN O. BARSTOW.

Attested by—
A. N. PATRIARCK,
LEO W. LOWE.